(12) United States Patent
Gundugola et al.

(10) Patent No.: US 9,806,954 B2
(45) Date of Patent: Oct. 31, 2017

(54) TRANSFORMATION ENGINE FOR DATACENTER COLOCATION AND NETWORK INTERCONNECTION PRODUCTS

(71) Applicant: Equinix, Inc., Redwood City, CA (US)

(72) Inventors: Prabhakar Gundugola, San Jose, CA (US); Vijaay Doraiswamy, Fremont, CA (US); Jaganathan Jeyapaul, San Jose, CA (US); Brian James Lillie, Los Altos, CA (US)

(73) Assignee: Equinix, Inc., Redwood City, CA (US)

( * ) Notice: Subject to any disclaimer, the term of this patent is extended or adjusted under 35 U.S.C. 154(b) by 805 days.

(21) Appl. No.: 14/294,552

(22) Filed: Jun. 3, 2014

(65) Prior Publication Data

US 2015/0350016 A1    Dec. 3, 2015

(51) Int. Cl.
*G06F 15/173* (2006.01)
*H04L 12/24* (2006.01)

(52) U.S. Cl.
CPC ........ *H04L 41/145* (2013.01); *H04L 41/0806* (2013.01); *H04L 41/0843* (2013.01)

(58) Field of Classification Search
CPC  H04L 41/0806; H04L 41/0843; H04L 41/145
See application file for complete search history.

(56) References Cited

U.S. PATENT DOCUMENTS

| | | | |
|---|---|---|---|
| 6,971,029 B1 | 11/2005 | Avery et al. | |
| 6,976,269 B1 | 12/2005 | Avery et al. | |
| 7,577,154 B1 | 8/2009 | Yung et al. | |
| 7,941,747 B2 * | 5/2011 | Jawaharlal | G06F 8/30 709/217 |
| 8,379,656 B2 | 2/2013 | Waldrop et al. | |
| 8,509,249 B2 | 8/2013 | Waldrop et al. | |
| 8,583,503 B2 | 11/2013 | Waldrop et al. | |
| 8,645,568 B2 | 2/2014 | Patterson et al. | |
| 8,650,805 B1 | 2/2014 | Widjaja et al. | |
| 2009/0292522 A1 * | 11/2009 | Maeda | G06F 9/45504 703/23 |
| 2010/0037168 A1 * | 2/2010 | Thayne | G06F 17/24 715/769 |
| 2010/0058302 A1 * | 3/2010 | Broscaru | G06F 8/47 717/151 |
| 2011/0058565 A1 | 3/2011 | Waldrop et al. | |
| 2011/0060657 A1 | 3/2011 | Waldrop et al. | |
| 2011/0060846 A1 | 3/2011 | Waldrop et al. | |
| 2011/0145292 A1 | 6/2011 | Lillie et al. | |
| 2011/0145399 A1 | 6/2011 | Jeyapaul et al. | |
| 2011/0145903 A1 | 6/2011 | Lillie et al. | |
| 2011/0295987 A1 * | 12/2011 | Petushkov | H04L 41/0226 709/223 |

\* cited by examiner

*Primary Examiner* — Mohamed Wasel (74) *Attorney, Agent, or Firm* — Shumaker & Sieffert, P.A.

(57) ABSTRACT

In general, techniques for integration of diverse software applications in i) a co-location facility, ii) communication interconnection network facility, or iii) both, are described. For example, a transformation engine for datacenter colocation and network interconnection products may assist in a dynamic i) transformation of commands and ii) data structure translation as well as data structure transformation between a source application (SA) and a target application (TA) via two or more translation assist templates.

20 Claims, 5 Drawing Sheets

Step- III: Product XSLT Regeneration from the MAIN PTE store

Step- IV: Loading the XSLT in the Integration Services Cache

Figure 5

TRANSFORMATION ENGINE FOR DATACENTER COLOCATION AND NETWORK INTERCONNECTION PRODUCTS

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to communication networks including Internet and Ethernet networks at i) a co-location facility, ii) a communication interconnection network facility or iii) both.

BACKGROUND OF THE INVENTION

Private carriers generally create their own private networks and this can become very expensive if they need to lay new lines all over the world.

SUMMARY

Embodiments described herein are connected with a transformation engine used with i) a co-location facility, ii) a communication interconnection network facility or ii) both. The transformation engine has two or more modules coded to assist in a dynamic i) transformation of commands and ii) data structure translation as well as data structure transformation between a source application and a target application. A nature of both the source application and the target application are for use in conjunction with the i) co-location facility, ii) communication interconnection network facility or ii) both.

The transformation engine is also configured to, at runtime, dynamically update configuration information used to dynamically transform the commands and data structures based on the updated configuration information occurring due to any of these three i) an addition of another source application, another target application, or new colocation or network interconnection product, ii) a change to an existing source application, an existing target application, or an existing colocation or a network interconnection product, or iii) any combination of both. The transformation engine is configured to generate two or more translation assist templates correlating to various combinations of the existing source applications, the existing target applications, and the new colocation interconnection products or the network interconnection products.

The transformation engine is configured to generate a new translation assist template when information regarding a new or updated application or product is loaded into a database. The transformation engine is configured to then send the new translation assist template to a cache used by an integration services middleware software layer to assist in the dynamic translation of any data structures and the dynamic transformation of any commands and data structures to dynamically map out how a grammar and structure of the first source application correlates to the first target application. The new translation assist template enables any structure and attribute changes to i) the colocation or network interconnection product or ii) the source application or the target application, or iii) any said combination of both, to be made dynamically by updating the configuration information loaded into the database without having to make any code modifications to the integration services middleware software layer configured to perform the dynamic translation and transformation between the grammar and the structure of the source application over to the grammar and the structure of the target application. Also, a plug-in module of the transformation engine has self-executing code configured to plug into and communicate with the integration services middleware software layer as long as that integration services middleware software layer uses i) XML, ii) an XML variant, or iii) an XML derivative software language.

BRIEF DESCRIPTION OF THE DRAWINGS

The multiple drawings refer to the embodiments of the design.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of products, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first source application, may be made. However, the specific numeric reference should not be interpreted as a literal sequential order but rather interpreted that the first source application is different from a second source application. Also, features discussed for one embodiment disclosed herein may in some instances be employed in another embodiment. Thus, the specific details set forth are merely exemplary. The specific details may be varied from and still be contemplated to be within the spirit and scope of the present invention.

In general, an example process of and apparatus to provide for the integration of diverse software applications in i) a co-location facility, ii) communication interconnection network facility or ii) both. A transformation engine may assist in a dynamic i) transformation of commands and ii) data structure translation as well as data structure transformation between a source application and a target application. A nature of both the source application and the target application are for use in conjunction with the i) co-location facility, ii) communication interconnection network facility or ii) both.

The transformation engine at runtime, may dynamically update configuration information used to dynamically transform the commands and the data structures based on the dynamic update occurring due to any of these three i) an addition of another source application, another target application, or new colocation or a network interconnection product, ii) a change occurs to an existing source application, existing target application, or existing colocation or network interconnection product, and iii) any combination of both. Multiple products, source applications and target applications may exist in the i) co-location facility, ii) communication interconnection network facility or ii) both.

The transformation engine may generate two or more translation assist templates that correlate to various combinations of the source applications, target applications, and the new colocation or the network interconnection products. The transformation engine may generate a new translation assist template when information regarding a new or updated application or product is loaded into a database. After generation of the new translation assist template, then the new translation assist template may be sent to a cache used by an integration services middleware software layer to assist in the dynamic translation and the dynamic transformation of the commands and the data structures to dynamically map out how a grammar and structure of the source application correlates to the target application. The new translation assist template enables any structure changes or attribute changes to i) the new colocation or the new network interconnection product or ii) the source or the target applications or iii) any said combination of both, to be made dynamically by updating the configuration information loaded into the database without having to make any code modifications to the integration services middleware software layer configured to perform the dynamic translation and the dynamic transformation between the grammar and the structure of the source application over to the grammar and the structure of the target application. Also, the transformation engine may plug into and communicating with the integration services middleware software layer as long as that integration services middleware software layer uses i) XML, ii) an XML variant, or iii) an XML derivative software language.

Figure 1:
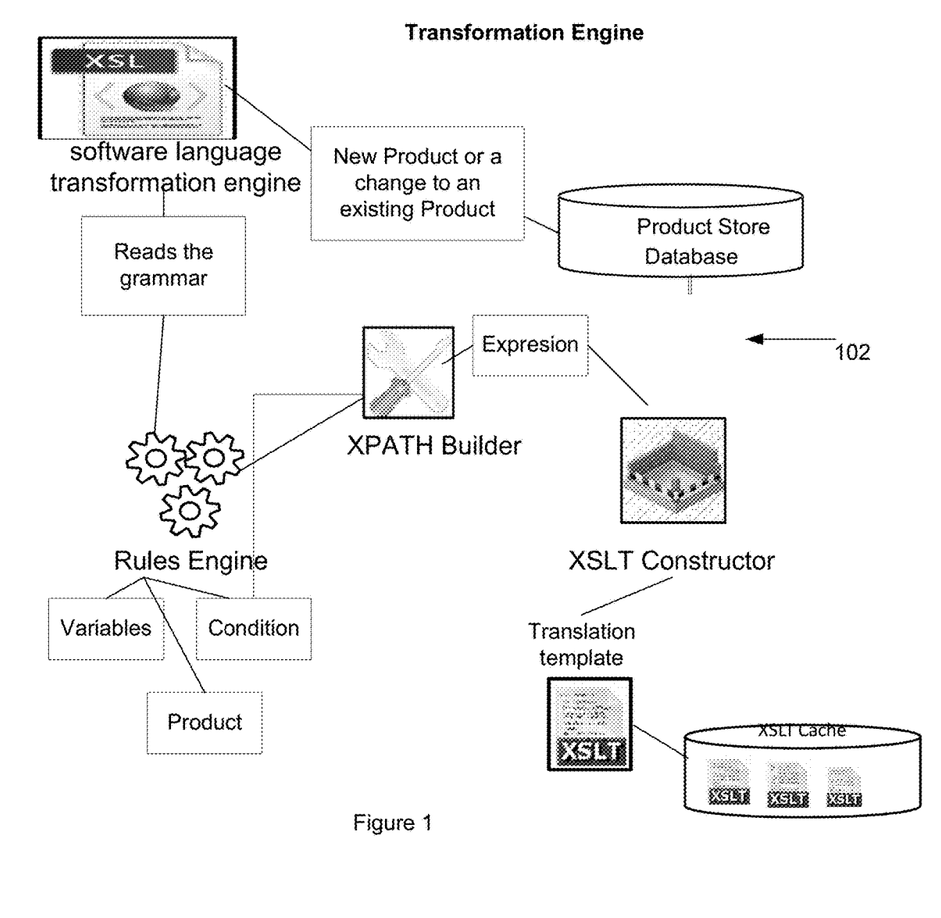
FIG. 1 illustrates an embodiment of a transformation engine for datacenter colocation & network interconnection products. This transformation engine has two or more modules coded to assist in i) a dynamic transformation of commands and ii) a dynamic data structure translation as well as data structure transformation between a source application and a target application via generation of one or more translation assist templates.

FIG. 1 illustrates an embodiment of a transformation engine that has two or more modules coded to assist in i) a dynamic transformation of commands and ii) a dynamic data structure translation as well as data structure transformation between a source application and a target application via generation of one or more translation assist templates. The transformation engine 102 may be used with i) a co-location facility, ii) a communication interconnection network facility or iii) both.

The transformation engine 102 has two or more modules coded to assist in i) a dynamic transformation of commands and ii) a dynamic data structure translation as well as data structure transformation between a source application and a target application. The nature of both the source application and the target application are for use in conjunction with i) the co-location facility, ii) the communication interconnection network facility or iii) both. Also, note, the functionality described as coded into the one or more modules may be shifted or combined into another module to perform the same functionality.

The transformation engine 102 further includes several modules to perform its configured functionality. These modules may include a rules engine module configured to process configuration rules for each 'colocation or network interconnection product, source application, and target application' combination; an XPath builder module configured to compute transformation rules stored in the database and send an expression used to construct the new translation assist template; a software language transformation engine configured to read and understand the grammar and structure of the configuration information expressed in multiple software applications formats; a XSLT constructor module to build the template; and potentially other similar modules.

The transformation engine 102 is also configured to, at runtime, dynamically update configuration information used to dynamically transform the commands and data structures based on the update occurring due to any of the following three reasons i) an addition of another source application, another target application, or new colocation or network interconnection product, ii) a change occurs to an existing source application, existing target application, or existing colocation or network interconnection product, or iii) any combination of both. Note, a given source application merely generates the initial command or communication intended for a given target application. The roles of a single application, such as a logistics software application or a billing software application, will most likely switch between being the source application and target application depending upon who generated the initial command or communication and which application is the target application by responding to that initial command or communication.

The offline creation of the templates and online use by the cache of the templates allows the above two dynamic updates and dynamic transformations to occur.

The transformation engine 102 is configured to generate two or more translation assist templates correlating to various combinations of source applications, target applications, and new colocation or network interconnection products. The transformation engine 102 is configured to generate a new translation assist template when information regarding a new or updated application or product is loaded into a database.

A first module in the translation engine 102 may be configured to trigger a request to the software language transformation engine when the updating of the configuration information loaded into the database occurs. When the software language transformation engine receives the request that configuration information for either a new colocation/network interconnection product or an update to an existing colocation/network interconnection product has been loaded into the product transformation store database, then it is configured to cause the software language transformation engine to look at the grammar and format of the new product or updated product. Thus, a configuration update occurs in the product transformation store database, which triggers a request to the software language transformation engine that does the following.

The software language transformation engine receives a notice that either a new colocation/network interconnection product or an update to an existing colocation/network interconnection product has been loaded into the product transformation store database, which then causes the software language transformation engine to look at the grammar and format of the new product. In an embodiment, the software language transformation engine may read the grammar of the source application and send the grammar along with metadata indicating the source application and target application to the rules engine. The rules engine checks multiple tables each with their own category of information such as variable attributes, conditional attributes, and gets the structured detailed variables, and then grabs the product information, which is all communicated to the XPath builder module. The XPath builder module then creates the XPath expression to be used to create the new translation assist template. Note, the software language transformation engine may be an Extensible Stylesheet Language Transformations (XSLT) engine.

Note, an XSLT software language translation module may read the grammar of the data for the source application based on the grammar type recorded in the table and then understands how to get the information from that source application and map that information to where the target application expects the data to be inputted in the context that the target application is expecting the data to be in.

The software language translation engine in the transformation engine 102 may be configured to generate the new XSLT template based on the latest configuration information in a set of tables stored in the database. The software language transformation engine is configured to understand the grammar and structure of the configuration data expressed in a software application's format as well as understands the grammar and structural format of that data expressed in a second software application's format. The software language transformation engine is configured to construct the new translation assist template based on the computed transformation rules stored in the set of tables and also the XPATH expression built using the XPATH builder module. The translation assist template is built offline and this significantly improves the performance of the dynamic translation between the source and target applications. The translation assist template conveys how to get information from the source application, and maps that information to both where the target application expects the data to be inputted in the context that the target application is expecting the data to be in. An instance of the new translation assist template is placed into the cache to assist in the dynamic transformation between the source and target application.

The rules engine is configured to invoke various rule checks in a set of two or more rules tables. The content in the rules tables is updated offline from a performance of the dynamic translation between the source and target applications; and thus, this allows the transformation engine 102 to create the new translation assist template offline. An instance of the new translation assist template is put into the cache and used by the integration services middleware layer online to dynamically perform translation between the source and target applications. The rules engine is configured to look at a syntax structure and grammar of the new product, or any changes to the existing product, and obtains them from the tables. An example set of two or more rules tables may include i) a Master table that contains general source and target information regarding each colocation product, ii) an Attribute master table that contains source application and target application information on where the position of an attribute is located; and thus, enabling the construction of the target message even if the order of the attribute changes on the source side, iii) a Target XSLT Grammar table that contains field names including the element's name, element description, syntax, element order, element type, the bracket type, etc., and iv) a Target XSLT Structure table to keep track of base and extended attributes along with their sequenced order of occurrence in the target application.

The rules engine computes the transformations based on the configurations in these tables stored in the PTS (Product Transformation Store) database. The rules engine processes the configuration rules for each updated product/interface combination.

As discussed, the XPath builder builds an expression. The XPath builder module computes and sends an expression to either the XSLT constructor or the software language translation engine, which constructs the XSLT translation assist template. In an embodiment, the constructed XPath expression either accesses or refers to parts of an XML document in order to assist in the translation assist template construction.

The XPath builder module can create an expression out of all the grammar that was read from the product, source application or target application, and what and where it is located, and then map where and how this information should be connected from the source application to the target application. Alternatively, the expression instructs how to translate the commands and data structures to a simplified flat hierarchical structure as required by the first target application.

The transformation engine 102 is configured to then send the newly constructed translation assist template to a cache used by an integration services middleware software layer. The cache uses a library of these templates to assist in the translation and transformation of the commands and data structures to dynamically map out how the grammar and structure of the various source applications for the facility correlate to the target applications for the facility. Note, the updating of the new translation assist template enables any structure or attribute changes to i) the colocation or network interconnection product or ii) the source or target applications, and iii) any combination of both, to be made dynamically by updating the configuration information loaded into the database, without having to make any code modifications to the integration services middleware software layer, as configured to perform the dynamic translation and transformation between the grammar and structure of the source application over to the grammar and structure of the target application.

As discussed, the transformation engine 102 is coded to understand the product structure and rules by accessing a database that stores product structures and rules for multiple product transformations. The database with the two or more translation assist templates for the combinations of source applications, target applications, and new colocation or network interconnection products forms a library that stores product structures and rules for multiple product transformations that can automate the mapping process for translations and transformations occurring between the source application and the target application in order to allow both applications to communicate and integrate with each other.

In general, network-neutral data centers and interconnection services may use an embodiment of the transformation engine 102. A colocation data center may be a facility used to house computer systems and associated components, such as telecommunications servers, routers, storage systems, and other networking equipment, and connect them to a variety of telecommunications and network service providers. The colocation datacenter can be a type of data center where equipment, space, and bandwidth are available for rental to multiple retail customers. A data center generally includes redundant or backup power supplies, redundant data communications connections, environmental controls (e.g., air conditioning, fire suppression) and various security devices. An interconnection facility may be a facility used to provide interconnections with one or more public carrier's telecommunication networks as well as supply interconnections between private networks. These facilities offer colocation, traffic exchanges and outsourced IT infrastructure solutions to enterprises, network service providers, content companies, and systems integrators worldwide. All the above services are packaged as colocation or network interconnection product bundles. These colocation or network interconnection product bundles may be modeled in a modeling application, such as Siebel's customer relationship management (CRM) application, to manage the quoting, order booking, order fulfillment and billing business functions that span across multiple application systems used in facilities like CapLogix (Capacity Management system), SingleView (Billing system), etc.

For all these data center colocation and interconnection products, the data center colocation and interconnection product structures and rules are highly complex, hierarchical, and unique in nature. There is a definite advantage to abstract these complex, hierarchical product structures modeled in the customer relationship management (CRM) application and provide only the required product information in a simplified format to the target applications, such as the Capacity Management system (CapLogix) and the Billing system (SingleView). Another definite advantage is to create a library of these potential transformations rather than write out custom integrations each time a change occurs within a colocation or network interconnection facility.

The transformation engine 102 may be a configuration that:

i) abstracts the complex multiple hierarchical colocation and interconnection product structures and rules modeled in a CRM application; ii) translates to simplified flat hierarchical structures required by target applications such as CapLogix & SingleView applications (target applications); iii) enables the decoupling of the integration services from a complex rule-processing engine; iv) enables the product structure and attribute changes dynamically without having to modify the integration services layer by updating the configuration store with the changes; and v) abstracts the complexity for performing the transformation, as the integration service would only be making a request to the engine 102 to perform the transformation.

Figure 2:
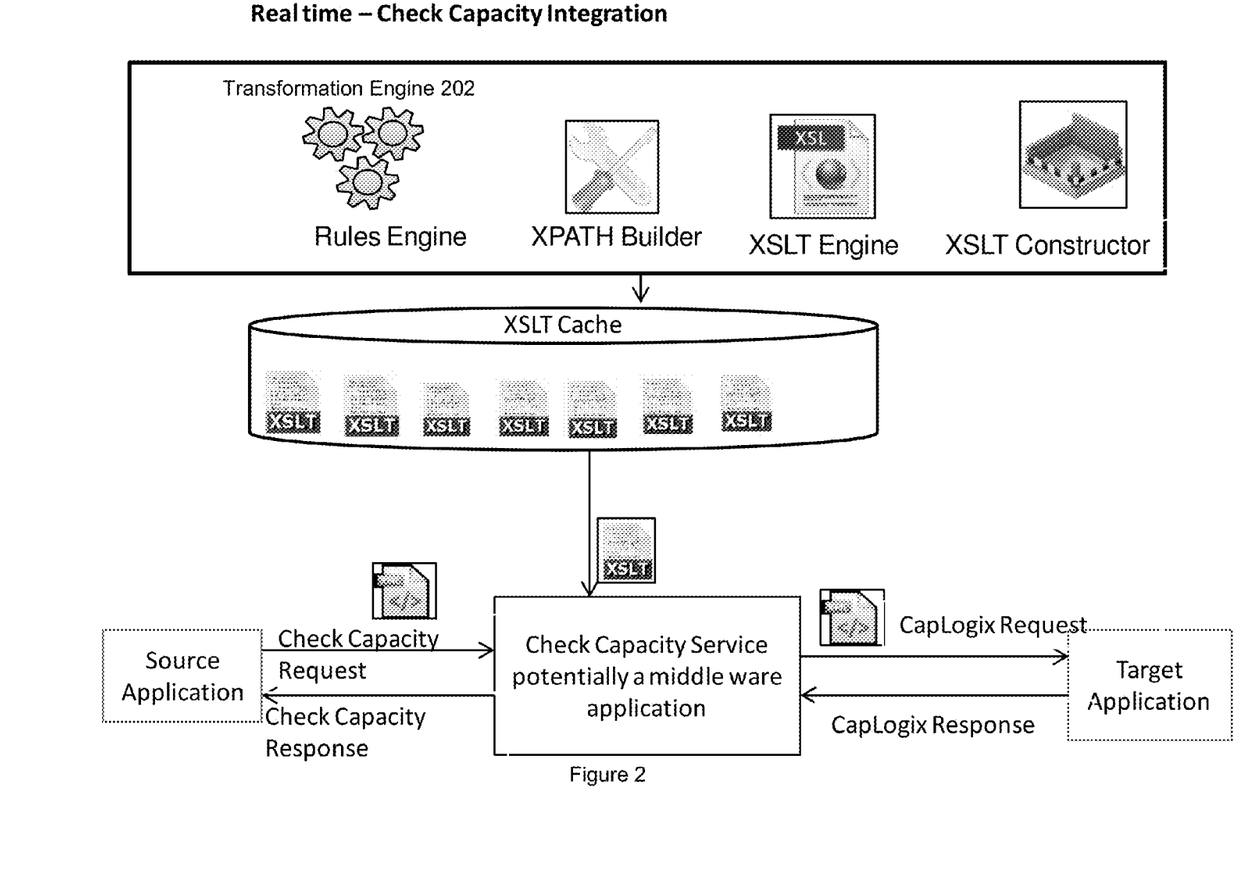
FIG. 2 illustrates an embodiment of the modules of the transformation engine configured to generate Extensible Stylesheet Language Transformations (XSLT) translation assist templates with configuration data for the dynamic translation and transformation for 'the colocation product structure and the source software application and a target software application' combinations and storing them into a cache for use by integration services middleware software.

FIG. 2 illustrates an embodiment of the modules of the transformation engine configured to generate Extensible Stylesheet Language Transformations (XSLT) translation assist templates with configuration data for the dynamic translation and transformation for 'the colocation product structure and the source software application and a target software application' combinations and storing them into a cache for use by i) an integration services middleware software or ii) a similar software.

A generated translation assist template is generally validated offline (see FIG. 4) and loaded to the cache. The translation assist templates can be Extensible Stylesheet Language Transformation (XSLT) templates. The software language transformation engine or the XSLT constructor may load the XSLT translation assist template into a configuration store. Each new XSLT translation assist template for the product-target application-source application combination is automatically loaded into the Integration Services Cache by an XSLT Cache Utility. The XSLT Cache stores all the XSLT translation assist templates for the product-target and application-source application combinations and is used to translate an incoming command or data message that has a complex, hierarchical product structure form and format from the source application to a simplified flat format that the target application understands. Note, the XSLT Stylesheet template may specify the presentation of a class of XML documents by describing how an instance of the class is transformed into an XML document that uses a formatting vocabulary, such as (X)HTML or XSL-FO.

Note, the automated code generation process of the software language transformation engine may be configured to generate translation assist templates with configuration data for the dynamic translation and transformation for 'the colocation product structure and the source software application and a target software application combination.' This process can be repeated for 'a first colocation product structure and the first source software application and the first target software application combination' as well as be repeated for each and every network interconnection or colocation product structure offered in conjunction with i) the colocation facility, ii) the network interconnection facility, and iii) any combination of both, and their source & target combinations. This automated process creates a library of templates in the cache that allows changes to product structures or additions of new products to be incorporated into the cache via a re-configuration process rather than a manual writing of custom coding process.

Thus, a library containing a plurality of translation assist templates for colocation and network interconnection products, source applications, and target applications combinations is being generated and stored in a database in contrast to having some human hard code an integration process between two applications at the facility location each time a change occurs to any of the source application, target application, or potential product involved in an exchange between source and target application at the facility location. The library containing a plurality of translation assist templates for colocation and network interconnection products, source applications, and target applications combinations is being generated and stored in a database that can automate and supply the configuration data and the mapping between the formats of the different applications and potential applications at the collocation facility to automate the process of translations and transformations occurring between the source and target applications, in order to allow both applications to communicate and integrate with each other.

This library may be created with all three of the known colocation products, known potential source applications, known potential target applications, and their combinations. In addition, for all of them, know what the grammar and format of the configuration data for the source application and then what the grammar structure format and hierarchy of the target application is. With this knowledge, the transformation engine 202 is going to generate a translation assist template to map the data format and where that data is found in the source application and where it is needed to be inputted into the target application. Note, a target application and/or source application with similar grammar and format of the configuration data may be grouped together to utilize the same translation assist template.

For example, for a given colocation or interconnection product, a message regarding that product from an application, such as the target software application, the software language transformation engine may look at the grammar of the configuration data and see that it is ordered such that the header comes first in the first field, then the detail in the next field, with the product information being in the third field, and the product elements in the last field. This knowledge will be stored and that transformation engine 202 will map the different format and hierarchy structures between the source application and the target application using the automatic generation of the templates. This process eliminates some human having to write out code each time a change occurs, including having to fully code and integrate the dynamic communication process at the colocation facility/interconnection network facility and instead, this library of translation assist templates has been created of known products, knowing potential source applications, and known potential target applications that include the grammar and format of the source application in a hierarchy of the source application and also what the grammar structure format and a hierarchy of the target application are, so that a mapping of corresponding data and its location in the source application, including where it's looking to be found in the target application, can all occur in order to create a translation assist template that allows the mapping to take place in a dynamic and automated fashion.

The cache stores XSLT translation assist templates for dynamic use by the integration service middleware software. The average time taken by the integration service middleware software to identify the right XSLT translation template file supplied by the software language transformation engine for this product-source application-target application combination, and then dynamically transform the command or data message from the source application into both the form and format of the target application can be less than 180 milliseconds. Note, the middleware software may be a software layer that lies between an operating system and applications on each side of a distributed computing system in a network. Also, the integration service middleware software retrieves the corresponding XSLT translation template file from the cache and transforms the source application's form and format such as Siebel's PoF XML file, into the target application's form and format such as a general XML file.

Next, a plug-in module of the transformation engine 202 has self-executing code configured to plug into and communicate with the integration services middleware software layer as long as that integration services middleware software layer uses i) XML, ii) an XML variant, or iii) an XML derivative software language.

The transformation engine 202 via the plug-in and templates can dynamically communicate with a middleware application to supply the middleware with the cache loaded with translation assist templates on how to translate between the source application and the target application via supplying the appropriate translation assist template for that set of source application and target application. Note, as discussed, the source application and the target application can both be focused and purposed for a colocation facility. The colocation and interconnection products generally can be, for example, provisioning of network connections in the collocation facility, storage and operating space in renting space inside the physical facilities of the collocation facility, etc.

A configuration store database may be used in conjunction with the software language transformation engine to generate the XSLT translation assist template for each product configuration (product-source and application-target application combination) and this occurs as an offline activity.

Figure 3:
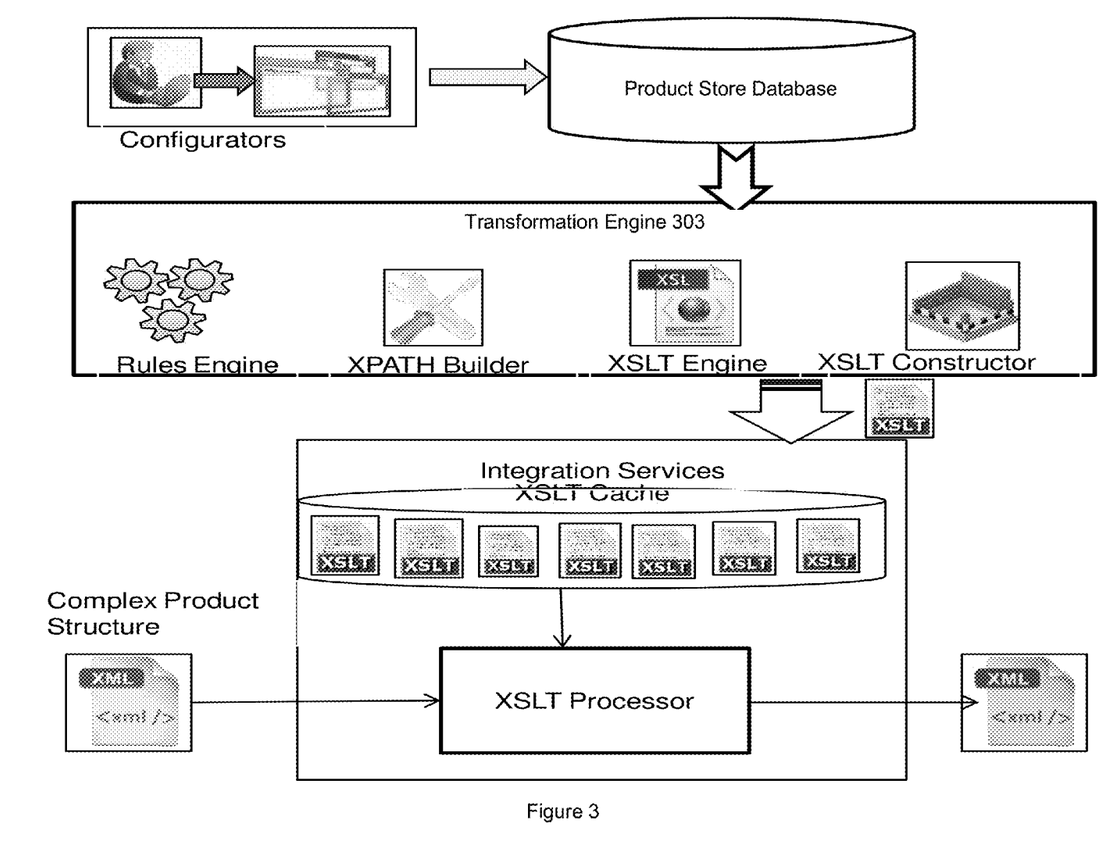
FIG. 3 illustrates an embodiment of the transformation engine configured to use a rules engine referencing tables to generate translation assist templates stored in the cache, in order to translate the commands and data structures to a simplified flat hierarchical structure required by the target application.

FIG. 3 illustrates an embodiment of the transformation engine configured to use a rules engine referencing tables to generate translation assist templates stored in the cache, in order to translate the commands and data structures to a simplified flat hierarchical structure required by the target application.

The transformation engine 302 is an offline component that allows configurators to supply configuration data about a new product, a source application, or a target application into tables stored in the PTS database. The product transformation store can also store how many software products exist and their structural format and how many possible source applications and target software applications exist. As new products' configurations change or new software source applications for software source applications or software target applications are added into the co-location facility, the network transformation engine 302 can dynamically scale and bring in automatic provisioning requests by simply adding in a little bit of data about the new source application or new product or new target application and then dynamically generate the translation assist template which allows translation between these two applications to dynamically occur. The dynamic translations incorporate the latest changes or additions to the co-location facility. This allows each product at the location facility to be decoupled from each other but collectively and dynamically exchange information between each other in an automated fashion.

The transformation engine 302 may be configured to supply the two or more translation assist templates to the cache in order to translate the commands and data structures to a simplified flat hierarchical structure required by the target application. The cache stores all the translation assist templates for the product-target and application-source application combinations. The translation assist templates are used by the integration services middleware software layer to translate an incoming command or data message that has a complex, hierarchical, product structure form and format from the source application over to a simplified flat format that the target application understands.

The PTS database can contain two or more tables that can be referenced by the rules engine module. The example tables may include at least i) a master table that contains information regarding the source application and target application interfaces along with a product ID, ii) an attribute table that contains information regarding the source application's and corresponding target application's attributes along with a level at which they occur as well as a direction with respect to the source application, and several other example tables further discussed below.

The rules engine executes rules by referencing the number of different tables. The different tables can have their category of items such as logical rules. Some additional example tables that may be included are a table that contains the target application's Grammar style, a table that contains the source application's Grammar style, a table that contains the target application's XSLT Structure, a table that contains the source application's structure; an XSLT condition master table, a Variable master table and other similar tables.

The rules engine queries the tables. For example, the XSLT target grammar table is queried (Q1) for the elements that would form the XSLT for the target message grammar style used. The table can contain information about the grammar style used, and other elements that would form the XSLT and subsequently the corresponding xml. The output of the query from this step is fed into an iteration block, which feeds into either of the sub-constructing blocks. If it is a syntax type of element, then it is simply mapped to output as it would be a tag/syntax (static fields) which would constitute the XSLT. If it is a base/extended attribute or a variable, it is sent to the corresponding sub-process, which is discussed in detail next.

When the data is a base/extended attribute or a variable, the query is sent to the corresponding sub-process. If the element queried is a base attribute, a call to the base attribute constructing sub-process is made. It gets the interface and element name and then queries (Q2) the target structure table to find all the attributes that would form the base attributes in the target structure. The output from query (Q2) is iterated upon to find the level of the attributes. Query (Q3) is fired to find the XPath expression for the attribute at a given level along with the target attribute name. Subsequent to this, a call to a custom java activity is made, which replaces the default content of the attribute XPath with the one queried in Q3. A mapper activity stitches the output together to form the base attributes for the target structure at Level 1 and Level 2. However, if the element queried is an extended attribute, a call to the sub-process (that helps constructing the extended attributes) is made. The input to the same would be the syntax and target interface. Query (Q4) would be used to construct placeholders for the name value pairs of the extended attributes on the target side. A subsequent query (Q5) would be used for providing values in those placeholder fields. An iteration block on Q5 helps build the corresponding XSLT using the concat operation.

Next, if the element queried is a variable, a respective sub-process to construct it with the XSLT is referenced. The variable master table is queried to construct the placeholder for variables that would be used to construct the XSLT. Custom java activities are used to place the value of a variable name value pair and using concat, the entire variable(s) in the XSLT are constructed.

The Master table may consist of source and target interface information along with the product Id. Once the XSLT is generated, it gets stored in this table for a corresponding product Id. The Attribute master table consists of attributes with respect to both source and target. The table also contains the XPATH expressions, which would help in determining the value of the attributes as they come in the input message while the XSLT is being built. The source and target level help determine the position of an attribute, thus enabling the construction of the target message even if the order of the attribute changes on the source side. The Target XSLT Grammar table contains field names including the element's name, element description, syntax, element order, element type, the bracket type, etc. The Target XSLT Structure table keeps track of base and extended attributes along with their sequence order of occurrence in the resulting target message. The contents of this table are used in conjunction with the helper methods in the transformation engine 302 to construct the message for the target application and the structural sequence used to convey the information. The Variable master table keeps track of all variables that are used in building the XSLT for the target message.

The order for the same is also tracked. The Condition master table keeps track of all conditions that are used in building the XSLT for the target message. The order for the same is also tracked.

The rules engine computes the transformations based on the configurations done in PTS (Product Transformation Store). The software language translation engine makes a function call to the rules engine in the network transformation engine. The rules engine executes rules by referencing these number of different tables.

Next, the transformation engine 302 is more than an application programming interface because the transformation engine 302 must understand the structure and format of the source application and how the source application conveys information, where that information is located in the source application including, if applicable, and what layer that information is located. Also, the transformation engine 302 must understand via a translation assist template, the target application's hierarchical structure, where that data information would be looked to be received in the target application, what layer and what field in the target application use that corresponding information, what format, and sequentially how the structure and grammar of that content would be formatted and presented to the target application. The network transformation engine 302 performs this translation function for multiple potential source applications at the co-location facility, multiple potential target applications at the co-location facility and multiple different types of colocation and inter connection products; where the colocation and inter connection products can vary from a request for quotes, a request to provision, the act of provisioning, and the act of reserving base/capacity for clients at the colocation facility, etc. Thus, the transformation engine may do both translation of communications (i.e., mapping inputs and outputs like a Application Programming Interface) as well as transformation of the format of those communications between source and target applications.

Figure 4:
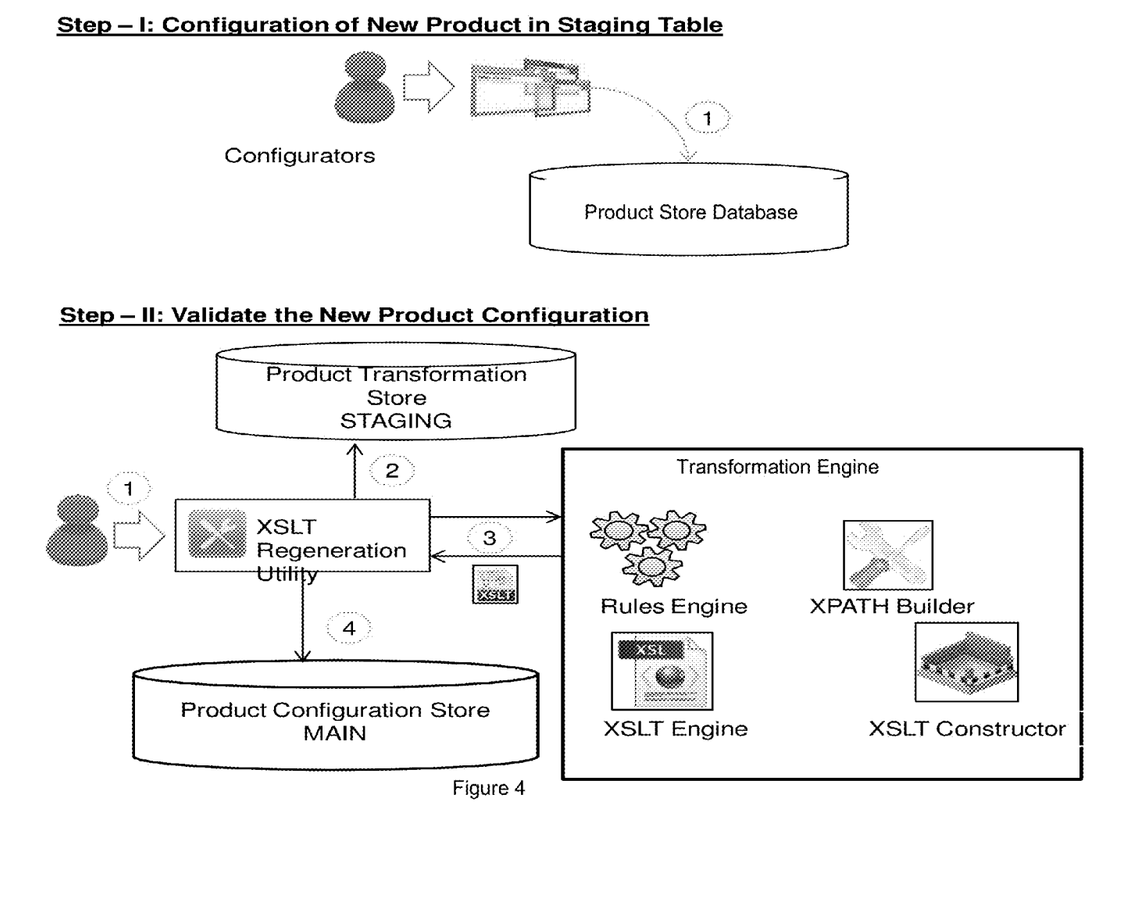
FIG. 4 illustrates an embodiment of performing some example steps of an offline processing of the colocation or network interconnection product structure and their rules as they correlate to both the source and target applications.

FIG. 4 illustrates an embodiment of performing some example steps of an offline processing of the colocation or network interconnection product structure and their rules as they correlate to both the source and target applications.

As discussed, changes that will be interactively done to product structures or new products, will be incorporated into the product transformation store database via a re-configuration (not coding) process. New XSLT templates will be generated and published. The process reuses the same transformation assets throughout the enterprise infrastructure to provide consistency and scalability without the need to write custom code.

The transformation engine such as a (Product Transformation Engine by Equinix) may have an additional one or more modules to aid in the configuring of the product transformation store database. For example, a module may aid in the validating of the product configuration data in a generated translation assist template. A module may load the XSLT translation assist templates into an integration service cache such as the middleware software's cache.

In example step 1, configuration of a new product's configuration data is inputted into a staging table. The configuration teams review the new product configurations and load the configuration data into the database. In an embodiment, the source application and target application integration teams review the new product configurations, new source applications, and/or new target applications and then load the configuration data into a product transformation store database. The source application and target application integration teams decide upon the attributes and then upload them to the staging tables, such as the master table, attribute table, etc. This can be done through a SQL loader or a utility that could read the input file (.csv or .xls) and upload to corresponding staging table, master table, attribute table, etc. The master table would contain the source and target interfaces along with a product Id. The attribute table would contain the source application and corresponding target application attributes along with the level at which they occur as well the direction with respect to the source application. The source application and target application integration teams also set up the subsequent XSLT target, grammar and variable tables to have the correct configuration with regards XSLT translation assist template generation.

Thus, the new colocation product configurations are reviewed and loaded in a configuration staging store database. Products and services available are used in conjunction with the colocation and interconnection facility and may each have a software representation model of that colocation product.

In step 2, validation of the new product's configuration occurs. A product XSLT regeneration utility gets the latest configuration details from the staging database. The product XSLT regeneration utility calls the staging database and the network transformation engine in order to generate the new XSLT template based on the latest configuration in the staging database. The generated XSLT template will be validated for any errors. Once the XSLT template is reviewed and validated, the utility will load the new configuration in the PTE store database. The XSLT constructor module creates an XSLT translation assist template. The generated XSLT translation assist template containing the configuration data for the new product is then validated for any errors. Potentially, a checking module runs a simulation to validate for any errors or the template may be manually checked for errors.

The Product Transformation Store database may contain a configuration store used in conjunction with the rules (XPATH) to generate the translation assist template, such as a Stylesheet (XSLT), for each product configuration.

Either an offline XSLT template validation utility or a team of people can make sure the product transformation logic between source applications and target applications are mapped out accurately and consistently. This validated template then allows for dynamic application of the mapping between the format of the source application to the target application as well dynamically updating this mapping at run time when a change occurs in the configuration data of a collocation product or change in format for the configuration data for an application used in conjunction with the colocation facility.

In the PTS database, any changes to the configuration data of an application or colocation product would be processed offline (thereby not impacting the current transactions) and once validated/verified these changes can be promoted to higher environments and eventually into production.

As discussed, in an embodiment, for each given software application used in conjunction with the colocation and network interconnection facility, such as the target software application, the two or more modules making up network transformation engine are configured to understand the grammar of the configuration data, and understand the format of the configuration data, such as how to order the configuration information. For example, the header information may come/be found in the first field, then the detail information may come/be found in the next field, the product version information may come/be found in the third field, etc. Each different software application may have a different format for its configuration information. Some applications will generally share the same or a very similar configuration formats and these software applications can be grouped together in the network transformation engine store when making an individualized template to map between source applications and target applications. Additionally, each different software application may have a different architecture with regards to the number of layers used in that application and where specific points of configuration data are found/inputted in that application's format. The knowledge will be stored and that transformation engine will map the different format and hierarchy structures between the source application and the target application using the automatic generation of the templates. This process eliminates having to write out code each time an individual software application needs to be integrated with the rest of the applications used in conjunction with the colocation facility.

Figure 5:
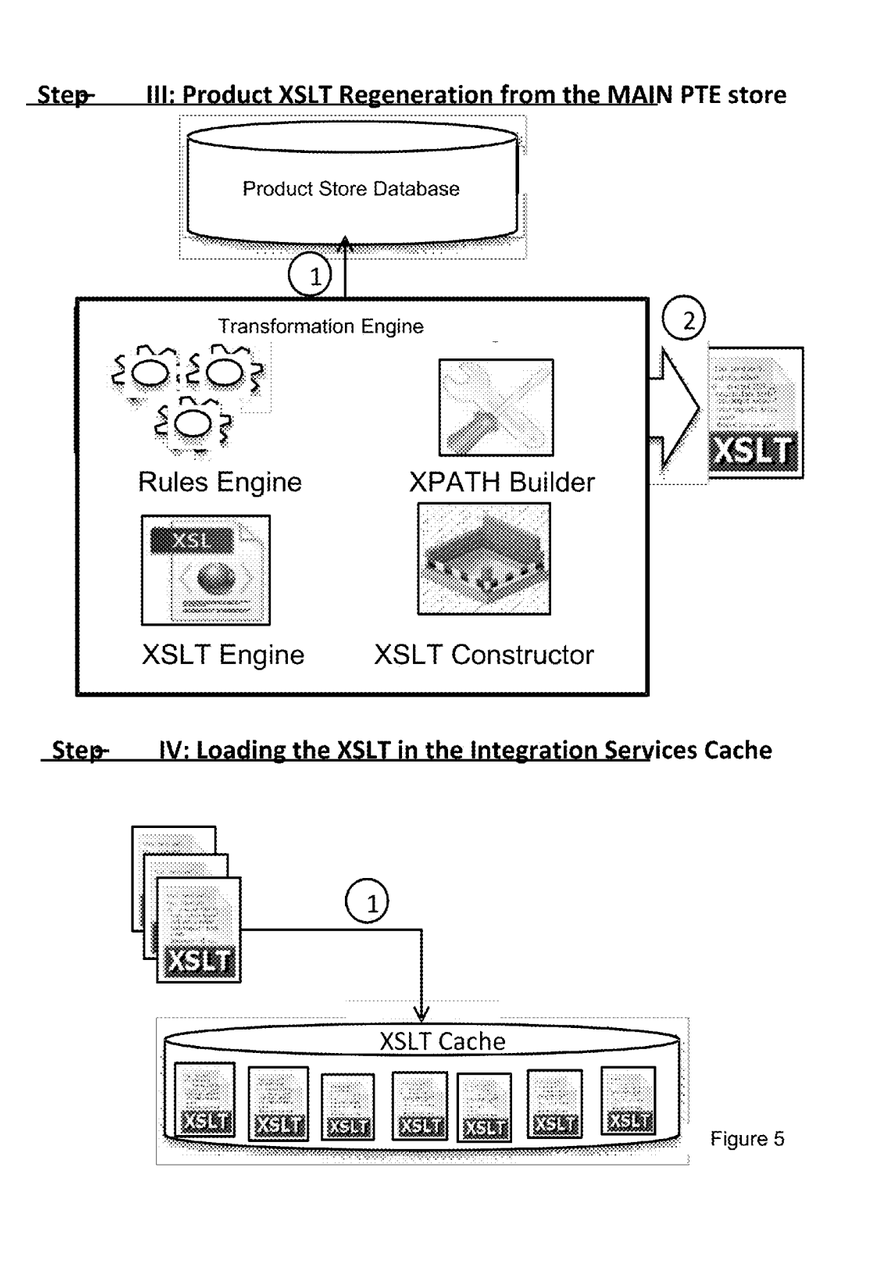
FIG. 5 illustrates an embodiment of performing some additional steps of the offline processing of the colocation or network interconnection product structure and their rules as they correlate to both the source and target applications.

FIG. 5 illustrates an embodiment of performing some additional steps of the offline processing of the colocation or network interconnection product structure and their rules as they correlate to both the source and target applications.

In step 3, product XSLT regeneration occurs from data in the PTE store database. As discussed, the configuration updates in the PTE store database triggers the transformation engine that uses its modules to generate the new translation assist template. The generated XSLT translation assist template has been validated and is pushed to the cache.

In step 4, loading the XSLT template into the integration services cache occurs. The new XSLT's are automatically loaded into the integration services cache by the XSLT cache utility module. Once the XSLT template containing the configuration data is reviewed and validated, the Product XSLT Regeneration Utility module loads the new configuration template in MAIN database as well as middleware cache that store product structures and rules for multiple product transformations. Thus, the XSLT Cache Utility of the transformation engine may load the XSLT style sheet template from the configuration store database into the Integration Services Cache. Next, at the run time, the integration services middleware software picks up relevant XSLT templates from the cache and performs a just in time (JIT) transformation of product structures. Thus, the transformation engine then performs a transformation of commands, such as function calls, & data formatting between the discrete co-location source application, such as a data management software application, and the target application, such as 3rd party logistics and tracking software application, regarding a co-location product because the transformation engine is coded to understand the product structure and rules via the XSLT style sheet template in the integration services cache.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These routines, algorithms, etc. may be written in a number of different programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

In an embodiment, the logic consists of electronic circuits that follow the rules of Boolean Logic, software that contain patterns of instructions, or any combination of both. A non-transitory storage medium, such as a memory, hard drive, etc. may contain instructions to perform any of the operations discussed herein. Further the modules of the transformation engine may be coded and built using a i) lightweight EXtensible Stylesheet Language or ii) Java programming language, or other similar programming language.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

What is claimed is:

1. A transformation engine comprising:
   at least one memory; and
   one or more electronic hardware components operably coupled to the at least one memory, the transformation engine for i) a datacenter co-location facility, ii) a communication interconnection network facility, or iii) both,
   where the transformation engine comprises two or more modules coded to assist in a dynamic i) transformation of commands and ii) data structure translation as well as data structure transformation between a first source application and a first target application, where a nature of both the first source application and the first target application are for use in conjunction with the i) co-location facility, ii) communication interconnection network facility or iii) both;
   where the transformation engine is configured to, at runtime, dynamically update configuration information used to dynamically transform the commands and data structures based on the updated configuration information occurring due to any of: i) an addition of another source application, another target application, or new colocation or network interconnection product, ii) a change to an existing source application, an existing target application, or an existing colocation or a network interconnection product, or iii) any combination of both;
   where the transformation engine is configured to generate two or more translation assist templates correlating to different combinations of the existing source applications, the existing target applications, and the new colocation or network interconnection product, where the network transformation engine is configured to generate a new translation assist template when information regarding a new or updated application or product is loaded into a database;
   where the transformation engine is configured to then send the new translation assist template to a cache used by an integration services middleware software layer to assist in the dynamic translation of any data structures and the dynamic transformation of any commands and data structures to dynamically map out how a grammar and structure of the first source application correlates to the first target application, where the new translation assist template enables any structure and attribute changes to i) the colocation or network interconnection product or ii) the first source application or the first target application, or iii) any said combination of both, to be made dynamically by updating the configuration information loaded into the database without having to make any code modifications to the integration services middleware software layer configured to perform the dynamic translation and transformation between the grammar and the structure of the first source application over to the grammar and the structure of the first target application; and
   a plug-in module of the transformation engine having self-executing code configured to plug into and communicate with the integration services middleware software layer when that integration services middleware software layer uses i) eXtensible Markup Language (XML), ii) an XML variant, or iii) an XML derivative software language.

2. The transformation engine of claim 1, where the transformation engine further includes one or more modules to perform its configured functionality, the one or more modules including a rules engine module configured to process configuration rules for each said new colocation or said network interconnection product and the source application and the target application combination, an XPATH builder module configured to compute transformation rules stored in the database and send an expression used to construct the new translation assist template, and a software language transformation engine configured to read and understand the grammar and the structure of the configuration information expressed in multiple software applications formats.

3. The transformation engine of claim 1, where the database with the two or more translation assist templates for the combinations of the source applications, the target applications, and the new colocation or said network interconnection products forms a library that stores product structures and rules for multiple product transformations that can automate a mapping process for the dynamic translations and the dynamic transformations occurring between the first source application and the first target application in order to allow both said applications to communicate and integrate with each other.

4. The transformation engine of claim 1, where the transformation engine is further configured to supply the two or more translation assist templates to the cache in order to translate the commands and the data structures to a simplified flat hierarchical structure required by the first target application, and where the cache stores all the two or more translation assist templates for product-target and application-source application combinations, and where the two or more translation assist templates are used by the integration services middleware software layer to translate an incoming command or a data message that has a complex, hierarchical, product structure form and format from the first source application over to a simplified flat format that the first target application understands.

5. The transformation engine of claim 2, where the database contains two or more tables that can be referenced by the rules engine module, including a master table that contains information regarding the first source application and first target application interfaces along with a product identifier, and an attribute table that contains the information regarding the first source application's and corresponding target application's attributes along with a level at which they occur as well as a direction with respect to the first source application.

6. The transformation engine of claim 2, further comprising:
a first module in the transformation engine configured to trigger a request to the software language transformation engine when the updating of the configuration information loaded into the database occurs, wherein when the software language transformation engine receives the request that the configuration information for either the new colocation or network interconnection product or an update to the existing colocation or network interconnection product has been loaded into the database, the first module is configured to cause the software language transformation engine to process the grammar and format of the new product or the updated product.

7. The transformation engine of claim 6, where the software language transformation engine reads the grammar of the first source application and sends the grammar along with metadata indicating the first source application and the first target application to the rules engine module, which reads multiple tables each with their own category of information such as variable attributes or conditional attributes, and gets structured detailed variables, and then reads product information and communicates the variable attributes, the conditional attributes, and the structured detailed variables to the XPath builder module that then creates an XPath expression to be used to create the new translation assist template.

8. The transformation engine of claim 2, where the software language transformation engine in the network transformation engine is configured to generate the new translation assist template based on a latest configuration information in a set of tables stored in the database, where the software language transformation engine is configured to understand the grammar and the structure of the configuration data expressed in a first software application's format as well as understand the grammar and structural format of that configuration data expressed in a second software application's format, where the software language transformation engine is configured to construct the new translation assist template based on the computed transformation rules stored in the set of tables and an XPATH expression built using the XPATH builder module,
where the new translation assist template is built offline from a performance of the dynamic translation between the source and the target applications, and where the new translation assist template conveys how to get information from the first source application, and maps that information to both where the target application is to receive the data to be inputted and in the context the target application is to receive the data in.

9. The transformation engine of claim 2, where the rules engine module is configured to invoke one or more rule checks in a set of two or more rules tables, where a content in the two or more rules tables is updated offline from a performance of the dynamic translation between the source and the target applications; and thus, allows the transformation engine to create the new translation assist template offline, where an instance of the new translation assist template is then put into the cache and used by the integration services middleware software layer online to dynamically perform said dynamic translation between the source and the target applications, where the rules engine module is configured to process a syntax structure and the grammar of the new product, or any changes to an existing product, and obtain them from the two or more rules tables, where the set of the two or more rules tables includes a Master table that contains general source information and target application information regarding each said colocation product, an attribute master table that contains the general source application information and the general target application information on where a position of an attribute is located; and thus, enables construction of a target message even if an order of the attribute changes on a source side, and a Target eXtensible Stylesheet Language Transformation (XSLT) Grammar table that contains field names including an element's name, element description, syntax, element order, or element type.

10. The transformation engine of claim 1, where the two or more translation assist templates are eXtensible Stylesheet Language Transformation (XSLT) templates, where an automated code generation process of a software language transformation engine is configured to generate XSLT translation assist templates with configuration data for the dynamic translation and the dynamic transformation for the first colocation product structure and the first source software application and a first target software application combination and then is repeated for each and every network interconnection or colocation product structure offered in conjunction with i) the colocation facility, ii) the communication interconnection network facility, or iii) any combination of both, and their source and target combinations, where this automated process creates a library of templates in the cache that allows for changes to the product structures or said additions of the new products to be incorporated into the cache via a re-configuration process rather than a manual writing of custom coding processes.

11. A method of integration of diverse software applications in i) a co-location facility, ii) communication interconnection network facility, or iii) both, comprising:
assisting in a dynamic i) transformation of commands and ii) data structure translation as well as data structure transformation between a first source application and a first target application, where a nature of both the first source application and the first target application are for use in conjunction with the i) co-location facility, ii) communication interconnection network facility, or iii) both;
at runtime, dynamically updating configuration information used to dynamically transform the commands and the data structures based on the dynamic update occurring due to any of: i) an addition of another source application, another target application, or new colocation or a network interconnection product, ii) a change occurs to an existing source application, existing target application, or existing colocation or network interconnection product, and iii) any combination of both;

generating two or more translation assist templates correlating to different combinations of the source applications, target applications, and the new colocation or network interconnection product;

generating a new translation assist template when information regarding a new or updated application or product is loaded into a database;

after generation of the new translation assist template, then sending the new translation assist template to a cache used by an integration services middleware software layer to assist in the dynamic translation and the dynamic transformation of the commands and the data structures to dynamically map out how a grammar and structure of the first source application correlates to the first target application, where the new translation assist template enables any structure changes or attribute changes to i) the new colocation or the new network interconnection product or ii) the source or the target applications or iii) any said combination of both, to be made dynamically by updating the configuration information loaded into the database without having to make any code modifications to the integration services middleware software layer configured to perform the dynamic translation and the dynamic transformation between the grammar and the structure of the first source application over to the grammar and the structure of the first target application; and plugging into and communicating with the integration services middleware software layer when that integration services middleware software layer uses i) eXtensible Markup Language (XML), ii) an XML variant, or iii) an XML derivative software language.

12. The method of claim 11, further comprising:
processing configuration rules for each said new colocation or network interconnection product, the source application, and the target application combination;
computing the transformation rules stored in the database and sending an expression used to construct the new translation assist template; and
reading and understanding the grammar and the structure of the configuration information expressed in multiple software applications formats.

13. The method of claim 11, where the database with the two or more translation assist templates for the combinations of the source applications, target applications, and said new colocation or the network interconnection product forms a library that stores product structures and rules for multiple product transformations that can automate a mapping process for the dynamic translations and transformations occurring between the first source application and the first target application in order to allow both said applications to communicate and integrate with each other.

14. The method of claim 11, further comprising:
supplying the two or more translation assist templates to the cache in order to translate the commands and the data structures to a simplified flat hierarchical structure required by the first target application; and
storing in the cache all the two or more translation assist templates for product-target application-source application combination's and using the two or more translation assist templates by the integration services middleware software layer to translate an incoming command or data message that has a complex, hierarchical, product structure form and format from the first source application and over to a simplified flat format that the first target application understands.

15. A non-transitory storage medium containing instructions, which when executed by a machine cause the machine to perform operations of claim 11, where a network transformation engine is coded and built using a i) lightweight eXtensible Stylesheet Language or ii) Java programming language.

16. The method of claim 12, further comprising:
referencing two or more tables in the database by the rules engine module, where the two or more tables include a master table that contains information regarding the first source application and the first target application interfaces along with a product identifier, and an attribute table that contains information regarding the source application's and the corresponding target application's attributes along with a level at which they occur as well as a direction with respect to the first source application.

17. The method of claim 12, further comprising:
triggering a request to a software language transformation engine when the dynamic updating of the configuration information is loaded into the database, wherein when the software language transformation engine receives the request that the configuration information for either a new colocation or network interconnection product or an update to said existing colocation or network interconnection product have been loaded into the database, then this is configured to cause the software language transformation engine to process the grammar and format of the new network interconnection product or said updated network interconnection product; and
reading the grammar of the source application and sending the grammar along with metadata indicating the source application and target application to a rules engine module, which reads multiple tables each with their own category of information and communicates the variable attributes, the conditional attributes, and the structured detailed variables to an)(Path builder module that then creates an XPath expression to be used to create the new translation assist template.

18. The method of claim 12, further comprising:
generating a new eXtensible Stylesheet Language Transformation (XSLT) template based on the latest configuration information in a set of tables stored in the database, where a software language transformation engine is configured to understand the grammar and the structure of configuration data expressed in a first software application's format as well as understands the grammar and structural format of that configuration data expressed in a second software application's format, where the software language transformation engine is configured to construct the new translation assist template based on computed transformation rules stored in the set of tables and an)(Path expression built using an)(Path builder module, and
where the new translation assist template is built off line from a performance of the dynamic translation between the source and target applications, and conveys how to get information from the first source application and maps that information to both where the first target application is to receive the configuration data to be inputted and in the context the target application is to receive the data in.

19. The method of claim 12, further comprising:
invoking one or more rule checks in a set of two or more rules tables, where a content in the two or more rules tables is updated offline from a performance of the dynamic translation between the source and the target applications; and thus, allows a translation engine to create the new translation assist template offline;

placing an instance of the new translation assist template into the cache to be used by the integration services to dynamically translate between the source and the target applications; and processing a syntax structure and the grammar of the new network interconnection product, or any said changes to an existing product, and obtains them from the tables, where the set of two or more rules tables includes a Master table that contains general source and target information regarding each colocation product, an attribute master table that contains source application and target application information on where a position of an attribute is located; and thus, enabling construction of a target message even if an order of the attribute changes on a source side, and a target eXtensible Stylesheet Language Transformation (XSLT) grammar table that contains field names including an element's name, element description, syntax, element order, and element type.

20. The method of claim 11, where the two or more translation assist templates are eXtensible Stylesheet Language Transformation (XSLT) templates, where an automated code generation process of a software language transformation engine is configured to generate XSLT translation assist templates with configuration data for the dynamic translation and the dynamic transformation for a first colocation product structure and the first source application and the first target application combination and then is repeated for each and every said network interconnection product or colocation product structure offered in conjunction with i) the colocation facility, ii) the network interconnection facility, and iii) any said combination of both, and their source and target applications' combinations, where this automated code generation process creates a library of templates in the cache that allows the changes to the product structures or additions of the new products to be incorporated into the cache via a re-configuration process rather than a manual writing of a custom coding process.

* * * * *

UNITED STATES PATENT AND TRADEMARK OFFICE
CERTIFICATE OF CORRECTION

PATENT NO. : 9,806,954 B2
APPLICATION NO. : 14/294552
DATED : October 31, 2017
INVENTOR(S) : Prabhakar Gundugola et al.

It is certified that error appears in the above-identified patent and that said Letters Patent is hereby corrected as shown below:

Page 1 of 1

In the Claims

Column 20, Line 42 (Claim 17): Replace "detailed variables to an)(Path builder" with --detailed variables to an XPath builder--

Column 20, Lines 58-59 (Claim 18): Replace "and an)(Path expression built using an)(Path builder module, and" with --and an XPath expression built using an XPath builder module, and--

Signed and Sealed this
Third Day of July, 2018

Andrei Iancu
*Director of the United States Patent and Trademark Office*